US006563500B1

(12) United States Patent
Kim et al.

(10) Patent No.: US 6,563,500 B1
(45) Date of Patent: May 13, 2003

(54) PROGRESSIVE 3D MESH CODING METHOD AND APPARATUS

(75) Inventors: Sung-jin Kim, Suwon (KR); Mun-sup Song, Yongin (KR); Euee-seon Jang, Suwon (KR); Mahn-jin Han, Seoul (KR); Yang-seock Seo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/379,595

(22) Filed: Aug. 24, 1999

(30) Foreign Application Priority Data

Aug. 29, 1998 (KR) ............................. 98-35420
May 29, 1999 (KR) ............................. 99-19620

(51) Int. Cl.[7] ............................................. G06T 17/20
(52) U.S. Cl. ...................... 345/423; 345/419; 345/440; 345/420
(58) Field of Search ................................ 345/423, 440, 345/473, 419, 420

(56) References Cited

U.S. PATENT DOCUMENTS 5,818,463 A * 10/1998 Tao et al. .................. 345/473
5,905,907 A * 5/1999 Rossignac et al. .......... 345/440
6,262,737 B1 * 7/2001 Li et al. ..................... 345/419

OTHER PUBLICATIONS

MPEG–4 SNHC Verification Model 9.0, SIO/IEC, JTC1/SC29/WG11, MPEG 98/W2301, Jul. 10, 1998.

* cited by examiner

Primary Examiner—Almis R. Jankus
Assistant Examiner—Lance W. Sealey
(74) Attorney, Agent, or Firm—Burns Doane Swecker & Mathis, LLP

(57) ABSTRACT

A progressive coding method and apparatus of three-dimensional (3D) mesh data is provided. The method includes the steps of (a) constructing a 3D triangle mesh of one or more mesh object layers, (b) partitioning each mesh object layer into a plurality of mesh components, (c) forming bitstreams in units of mesh components and coding the same, and (d) combining the coded mesh components into compressed bitstreams and transmitting the same. Therefore, progressive 3D mesh restoration is allowed, and the entropy coding efficiency can be enhanced.

22 Claims, 15 Drawing Sheets

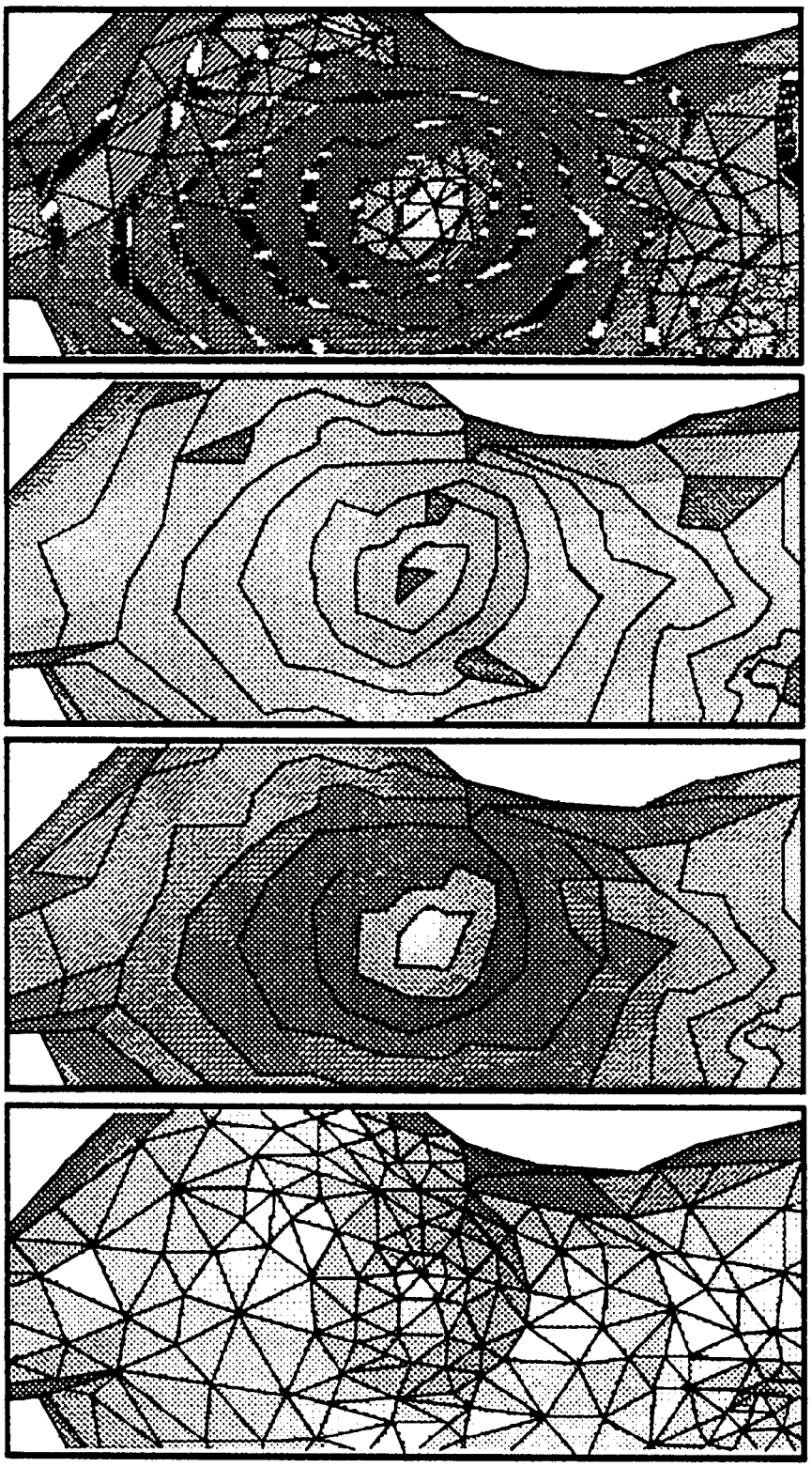

FIG. 3
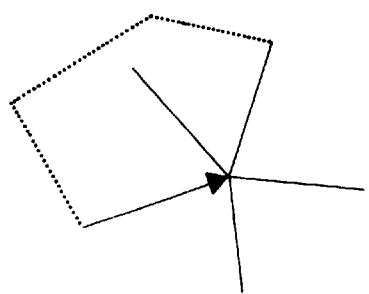
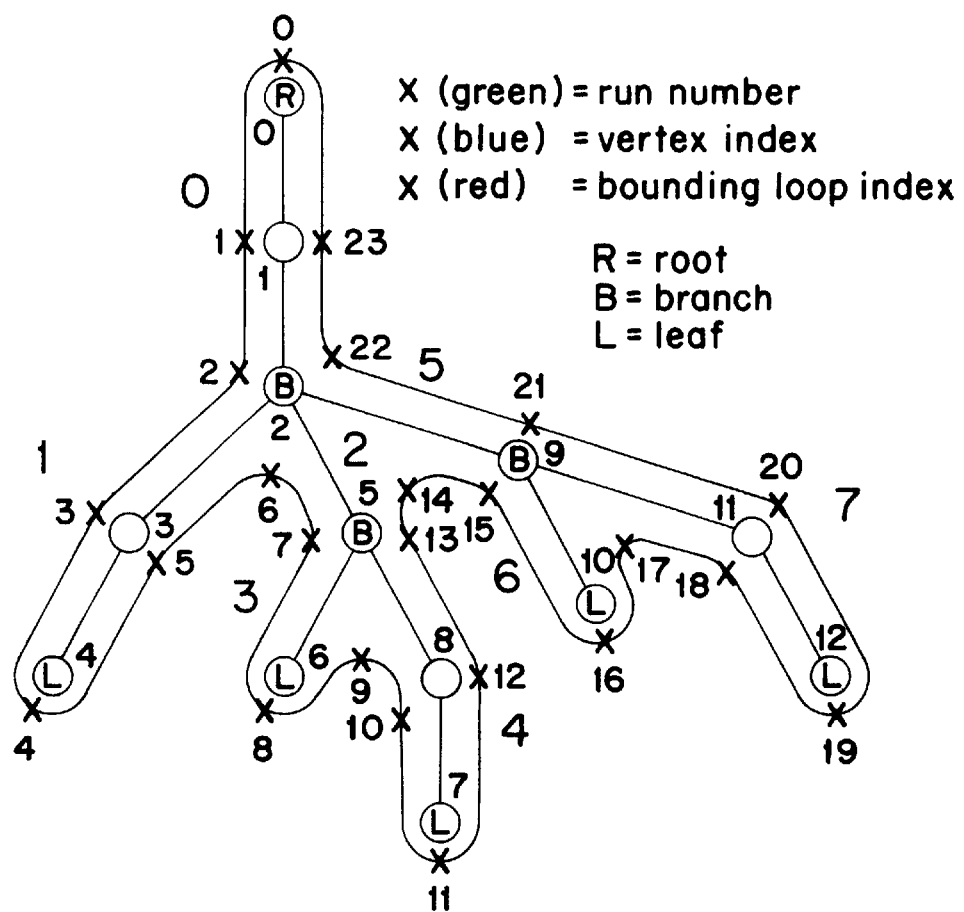
X (green) = run number
X (blue) = vertex index
X (red) = bounding loop index
R = root
B = branch
L = leaf
FIG. 4

| vrun | 1 | 1 | 1 | 1 | 0 |
|---|---|---|---|---|---|
| vleaf | 0 | 1 | 0 | 1 | VOID |
| Y-vertex | 0 | 0 | 1 | 1 | VOID |

| Y-VERTICES_PER_DATA |
|---|

PROGRESSIVE 3D MESH CODING METHOD AND APPARATUS

BACKGROUND OF THE INVENTION

1. Field of the Invention

This application claims priority under 35 U.S.C. §§119 and/or 365 to 98-35420 filed in Korea on Aug. 29, 1998, and 99-19620 filed in Korea on May 29, 1999; the entire content of which is hereby incorporated by reference.

The present invention relates to coding of three-dimensional (3D) mesh data, and more particularly, to a progressive coding method and apparatus using topological surgery with respect to three-dimensional (3D) mesh data used in the fields of motion picture experts group-4 synthetic and natural hybrid coding (MPEG-4 SNHC), virtual reality modelling language (VRML) and the like.

2. Description of the Related Art

In transmitting 3D objects composed of 3D mesh data, it is very important to progressively restore transmitted data as well as to effectively code the 3D mesh data. In the event that a data error is generated due to a transmission path error, a progressive restoration would allow transmitted data to be partially restored and minimize the amount of mesh data to be retransmitted. The progressive restoration method which is robust against such communication path errors can be effectively used in wireless communications or low transmission rate communications.

In the conventional coding method of 3D mesh data, since the mesh data is continuously coded, it is almost impossible to partially restore data before an entire bitstream is received. Also, due to transmission path errors generated during transmission, even if only a part of the data is damaged, the entire bitstream of data must be received again. For example, ISO/IEC JTC1/SC29/WG11 MPEG98/W2301, "MPEG-4 SNHC Verification Model 9.0" proposed by I.B.M. Corp. is currently being adopted as an MPEG-4 SNHC 3D mesh coding technology.

In MPEG-4 SNHC, mesh coding is designed based on VRML. In the VRML, a mesh is described in a node form referred to as an IndexedFaceSet. One of the main technologies for coding mesh data is a topological surgery proposed by I.B.M. Corp. According to this technology, it is assumed that any given mesh is topologically the same as a sphere. Then, the mesh is cut along given cutting-edges to generate a triangle spanning graph having a binary tree structure. Here, the cutting-edges defined for cutting the mesh are configured such that it connects vertices of the mesh, that is, it is given as a tree structure having a loop. The cutting-edges are referred to as a vertex spanning graph. Thus, two tree structures, that is, the triangle spanning graph and the vertex spanning graph, are coded/decoded, thereby restoring the original mesh without loss.

According to MPEG-4 SNHC, although there may be multiple IndexedFaceSets in a VRML file, compression is generally performed on the unit of one IndexedFaceSet. However, a single IndexedFaceSet can be formed by several connected components. In other words, assuming that a set of polygons capable of connecting vertices is a connected component, IndexedFaceSet can be formed by several connected components.

In general, for fast graphics processing, modeling must be performed in units of triangles. These triangles are not formed randomly but are preferably connected to each other in the form of strips or fans. Also, the more symbols that are repeatedly represented, the better the compressibility is. To this end, a mesh formed by a single long triangular strip is proposed by I.B.M. Corp. in view of fast graphics processing and better compressibility.

FIGS. 1A through 1F illustrate a conventional procedure for generating a vertex spanning graph and a triangle spanning graph in an example of a triangular mesh. FIGS. 1A and 1D illustrate a method for cutting a mesh along cutting-edges drawn by a thick line. FIG. 1B illustrates the overall format of the cutting-edges. FIG. 1E illustrates the configuration of edges and vertices produced by cutting along the cutting-edges shown in FIG. 1B. FIG. 1C illustrates a vertex spanning graph made by connecting vertices which reference cutting points. FIG. 1F illustrates a triangle spanning graph in which a strip which is a set of connected triangles by cutting the mesh along the vertex spanning graph. Also, if the triangle spanning graph is generated by the method shown in FIGS. 1A through 1F, the length of a run of two branching runs in the triangle spanning graph becomes considerably shorter than the other.

FIGS. 2A through 2D illustrate an example of a topological surgery technique applied to actual mesh data. In a vertex spanning graph, a branch can branch off into several branches. FIG. 3 illustrates an example of a vertex spanning graph having a loop, in which a vertex run returns to a location of one of the previous vertices. Since a mesh can be formed by several connected components, each connected component forming the mesh generates a pair of a vertex spanning graph shown in FIG. 1F and a triangle spanning graph shown in FIG. 1C. Therefore, if a single IndexedFaceSet is coded, several pairs of triangle spanning graphs and vertex spanning graph can be obtained.

The method for restoring the data coded by the above-described method is as follows:

1. A bounding loop is generated using a vertex spanning graph.

2. When the third vertex of a triangle branching off in a triangle spanning tree is referred to as a Y-vertex, the Y-vertex is calculated using bitstreams of the triangle spanning tree.

3. Triangles or polygons are generated using a triangle marching bit of the triangle spanning graph.

Lossless compression using arithmetic coding of the vertex spanning graph and the triangle spanning graph has been proposed by I.B.M. Corp. However, according to this method, in order to reconstruct the original structure, all bitstreams must be input and the following problems arise:

1. Since all bitstreams must be input in order to decode data, in any event of a transmission error, all bitstreams must be retransmitted.

2. In the case when the magnitude of compressed data is large, it takes a long time to transmit the data completely and a user must wait during such a time.

To overcome the disadvantages of the conventional technology, the following functions must be satisfied.

1. Even if a transmission error is generated, only the portion having the transmission error can be retransmitted, thereby reducing the network load and the transmission time.

2. Restoration is allowed in which only a part of the data and triangles or polygons for the restored portion are processed to be displayed on a screen.

Implementation of these two functions while maintaining the basic structure of the conventional method proposed by I.B.M. Corp. depends on effective processing of the bounding loop and Y-vertex, as shown in FIG. 4. In order to calculate a Y-vertex in a restoration process, at least one of two branching triangle runs must be received. In FIG. 1F, points 10, 14 and 18 are Y-vertices. For triangles within a triangle run, indices for the three vertices of each triangle can be determined using the marching bit pattern and the bounding loop. However, in order to determined the indices of Y-vertices which are the third vertices of branching triangles, all bitstreams for one of two triangle runs next to the branching triangles must be received. Therefore, the triangles next to the branching triangles cannot be restored to be displayed until subsequent bitstreams are received. This problem is not generated in the method proposed by I.B.M. Corp., which is based on the assumption that all bitstreams are received. However, in order to restore and display the triangles in the input order, this problem must be solved.

FIG. 5 is a conceptual block diagram of a three-dimensional (3D) mesh information coding/decoding method adopted in a conventional MPEG4 transmission system. In FIG. 5, 3D mesh data 100 is divided into connectivity information and geometry information and coded by a connectivity coder 102 and a geometry coder 103. Here, vertex structure information 105 is transmitted from the connectivity coder 102 to a geometry coder 103. The information compressed by the connectivity coder 102 and the geometry coder 103 is replaced to bitstream 111 compressed by an entropy coder 104.

The compressed bitstream 111 is input to a decoding part 114. In other words, the compressed bitstream 111 is divided into connectivity information and geometry information via an entropy decoder 106 and then decoded by a connectivity decoder 107 and a geometry decoder 108, respectively. Like in the coding part 101, vertex structure information 109 is transmitted from the connectivity decoder 107 to the geometry decoder 108. A decoded 3D mesh 110 can be constructed using the decoded connectivity information and geometry information.

Also, optionally, photometry information such as color, normal or texture coordinate is coded by a photometry encoder 112 and then decoded by a photometry decoder 113.

As shown in FIG. 5, a 3D mesh can be transmitted in the form of a compressed bitstream in a communication path. However, since the conventional MPEG data compression method employs the entropy coder 104, the method is vulnerable to transmission errors generated in the communication path.

First, the definitions of terms used in the 3-D mesh data coding method will be first described as follows.

Virtual reality modeling language (VRML): The VRML is a graphic standard format prepared for describing and transmitting a virtual space on the Internet.

Moving Picture Experts Group (MPEG): The MPEG is a group for carrying out international standardization activities for standardizing compression formats for transmitting a variety of media such as video.

Mesh: A mesh is a representation of an object constructed of several polygons.

Node: A node is a vertex in a vertex spanning graph or a minimum description unit used in VRML.

Topological surgery: Topological surgery is a mesh coding method proposed by I.B.M. Corp. in which a mesh is cut along a given path in order to make the mesh into the form of strips.

Vertex spanning graph: A vertex spanning graph is a path for cutting a mesh in the topological surgery.

Triangle spanning tree: The triangle spanning tree is a triangle strip produced by cutting a mesh along the vertex spanning graph and has a binary tree structure.

vlast: A vlast indicates whether the current run is the last branch or not. If the current run is the last branch, the value of vlast is 1, and 0 otherwise.

vrun: A vrun is a set of connected vertices and ends with a branch or vleaf.

vleaf: A vleaf indicates whether the current vertex run ends with a leaf or a branch. If the current vertex run ends with a leaf, the value of vleaf is 1, and 0 otherwise.

loopstart: The leaf of a vertex run may meet another vertex run to form a loop. In such a case, the start of the loop is indicated by the loopstart.

loopend: In the case when the leaf of a vertex run forms a loop, the end of the loop is indicated by the loopend.

loopmap: A loopmap indicates connectivity information between the loopstart and the loopend and is a set of indices connecting edges from the loopstart to the loopend.

trun: A trun is a set of consecutive triangles and the end thereof is a leaf triangle or a branching triangle.

tleaf: A tleaf indicates whether the run of a triangle ends with a leaf triangle or a branching triangle. If the run of a triangle ends with a leaf triangle, the value of tleaf is 1, and 0 otherwise.

tmarching: A tmarching describes the marching aspect of triangles. If a strip has an edge at its right boundary, the value of tmarching is 1. If a strip has an edge at its left boundary, the value of tmarching is 0.

ispolygonedge: An ispolygonedge indicates whether a current edge is given from the original mesh model or inserted for representing the polygon as a set of triangles. If a current edge is given from the original mesh model, the value of polygonedge is 1, and 0 otherwise.

SUMMARY OF THE INVENTION

To solve the above problems, it is an objective of the present invention to provide a method and apparatus for progressively coding 3D mesh information using topological surgery, by which progressive 3D mesh restoration and 3D mesh layer discrimination are achieved by reconstructing bitstreams in units of mesh components, and the 3D mesh information can be reproduced in units of a single triangle by using vertex binary tree and triangle binary tree information.

To achieve a method for progressively coding 3D mesh information, there is provided a progressive three dimensional (3D) mesh coding method for progressive restoration of 3D mesh information including the steps of (a) constructing a 3D triangle mesh of one or more mesh object layers, (b) partitioning each mesh object layer into a plurality of mesh components, (c) forming bitstreams in units of mesh components and coding the same, and (d) combining the coded mesh components into compressed bitstreams and transmitting the same.

Also, according to another aspect of the present invention, there is provided a progressive 3D mesh coding method including the steps of (a) constructing a 3D triangle mesh of one or more mesh object layers, (b) partitioning each mesh object layer into a plurality of mesh components, (c) classifying the plurality of mesh components in accordance with size information of each mesh component, combining mesh components having a first predetermined size or smaller and reconstructing all mesh components to have a size greater than the first predetermined size, (d) partitioning mesh data in each mesh component into units of bitstreams having a second predetermined size and coding the same, and (e) combining the coded mesh data into compressed bitstreams and transmitting the same.

According to still another aspect of the present invention, there is provided a progressive 3D mesh coding method including the steps of (a) constructing a 3D triangle mesh of one or more mesh object layers, (b) partitioning each mesh object layer into a plurality of mesh components, (c) inserting orientation information indicating the coding order of branches having branched from a branching triangle of a triangle binary tree into each mesh component, and coding the same, and (d) combining the coded mesh data into compressed bitstreams and transmitting the same.

To achieve an apparatus for progressively coding 3D mesh information, there is provided a progressive three dimensional (3D) mesh coding apparatus for progressive restoration of 3D mesh information including a 3D mesh data analyzing portion for constructing a 3D triangle mesh of one or more mesh object layers and partitioning each mesh object layer into a plurality of mesh components, a plurality of mesh component encoders for forming bitstreams in units of mesh components and coding the same, and a multiplexer for combining the coded mesh components into compressed bitstreams and transmitting the same.

Also, according to another aspect of the present invention, there is provided a progressive 3D mesh coding apparatus including a 3D mesh data partitioning portion for constructing a 3D triangle mesh of one or more mesh object layers and partitioning each mesh object layer into a plurality of mesh components, a 3D mesh data classifying and combining portion for classifying the plurality of mesh components in accordance with size information of each mesh component, combining mesh components having a size less than or equal to a first predetermined size and reconstructing all mesh components to have a first predetermined size, a plurality of mesh component encoders for partitioning mesh data in each mesh component into units of bitstreams having a second predetermined size and coding the same, and a multiplexer for combining the coded mesh data into compressed bitstreams and transmitting the same.

According to still another aspect of the present invention, there is provided a progressive three dimensional (3D) mesh coding apparatus for progressive restoration of 3D mesh information including a 3D mesh data analyzing portion for constructing a 3D triangle mesh of one or more mesh object layers and partitioning each mesh object layer into a plurality of mesh components, a 3D mesh data classifying and combining portion for classifying the plurality of mesh components in accordance with size information of each mesh component, combining mesh components having a size less that or equal to a first predetermined size and reconstructing all mesh components to have a first predetermined size, an orientation determining portion for inserting into the mesh data in each mesh component among the reconstructed mesh components, orientation information representing the coding order in a triangle branching in two directions in triangle binary tree information, a plurality of mesh component encoders for forming bitstreams in units of mesh components and coding the same, and a multiplexer for combining the coded mesh components into compressed bitstreams and transmitting the same.

BRIEF DESCRIPTION OF THE DRAWINGS

The above objectives and advantages of the present invention will become more apparent by describing in detail a preferred embodiment thereof with reference to the attached drawings in which:

FIGS. 2A through 2D illustrate an example of topological surgery;

FIG. 3 illustrates an example of a vertex spanning graph having a loop;

FIG. 4 illustrates the construction method of a bounding loop;

DESCRIPTION OF THE PREFERRED EMBODIMENTS

Firstly, for progressive processing of a 3D mesh, in the present invention, a new mesh structure is proposed. A 3D mesh object (MO) can be reconstructed as several mesh object layers (MOLs) which are mesh data divided into several layers. Here, each MOL contains one or more mesh components MCOMs. Each MCOM contains connectivity information, geometry information and photometry information necessary for its own restoration. In other words, a MO can be represented as a unit of 3-D mesh objects to be coded and classified into several layers in accordance with various levels of picture quality and functions. Each classified layer is defined as a mesh object layer (MOL). Also, when a 3-D mesh object is constructed by several independent non-connected meshes, that is, connected components, using topological surgery, the MCOM is defined as the independent mesh combined or partitioned in accordance with the size of data to be coded or other characteristics.

Figure 1C:
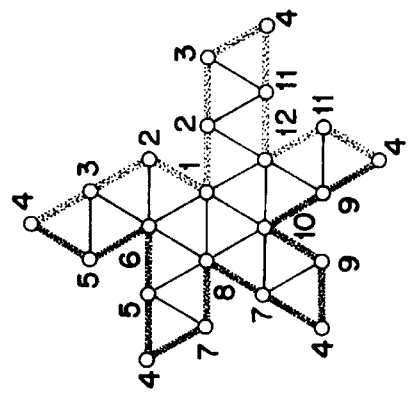
FIGS. 1A through 1F illustrate a conventional method for generating a vertex spanning graph and a triangle spanning graph in an example of a triangular mesh.
Figure 1F:
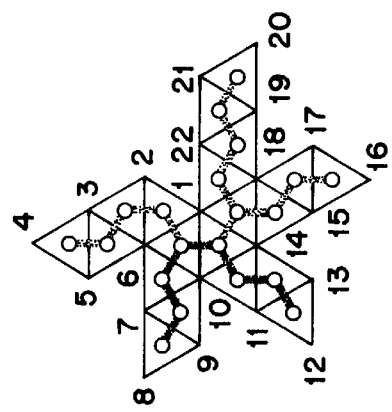
Figure 1B:
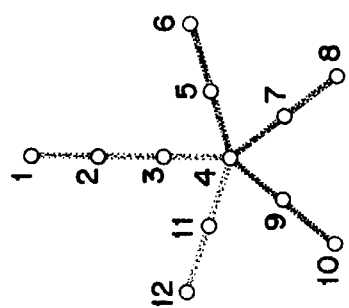
Figure 1E:
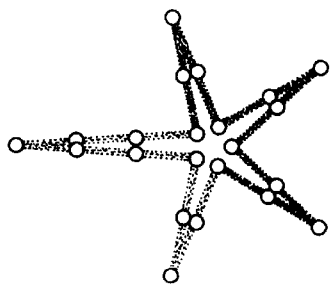
Figure 1A:
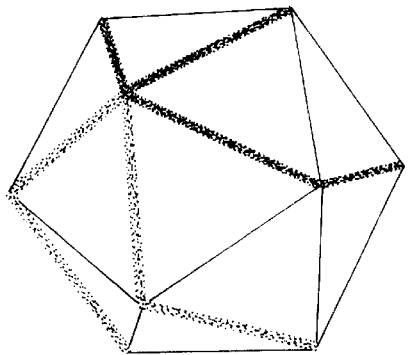
Figure 1D:
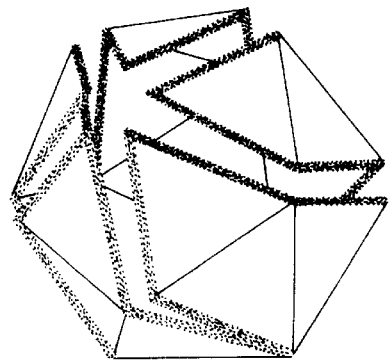
Figure 5:
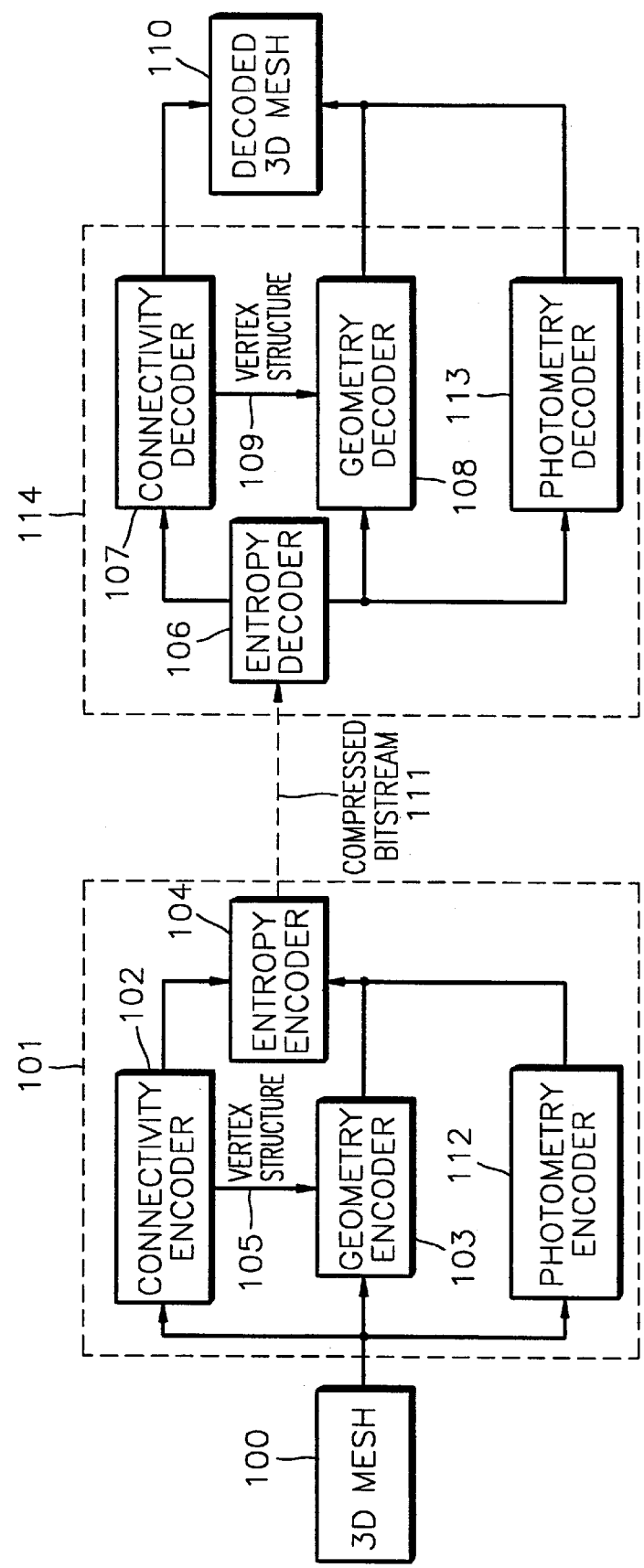
FIG. 5 is a conceptual block diagram of a conventional 3D mesh information coding method.
Figure 6:
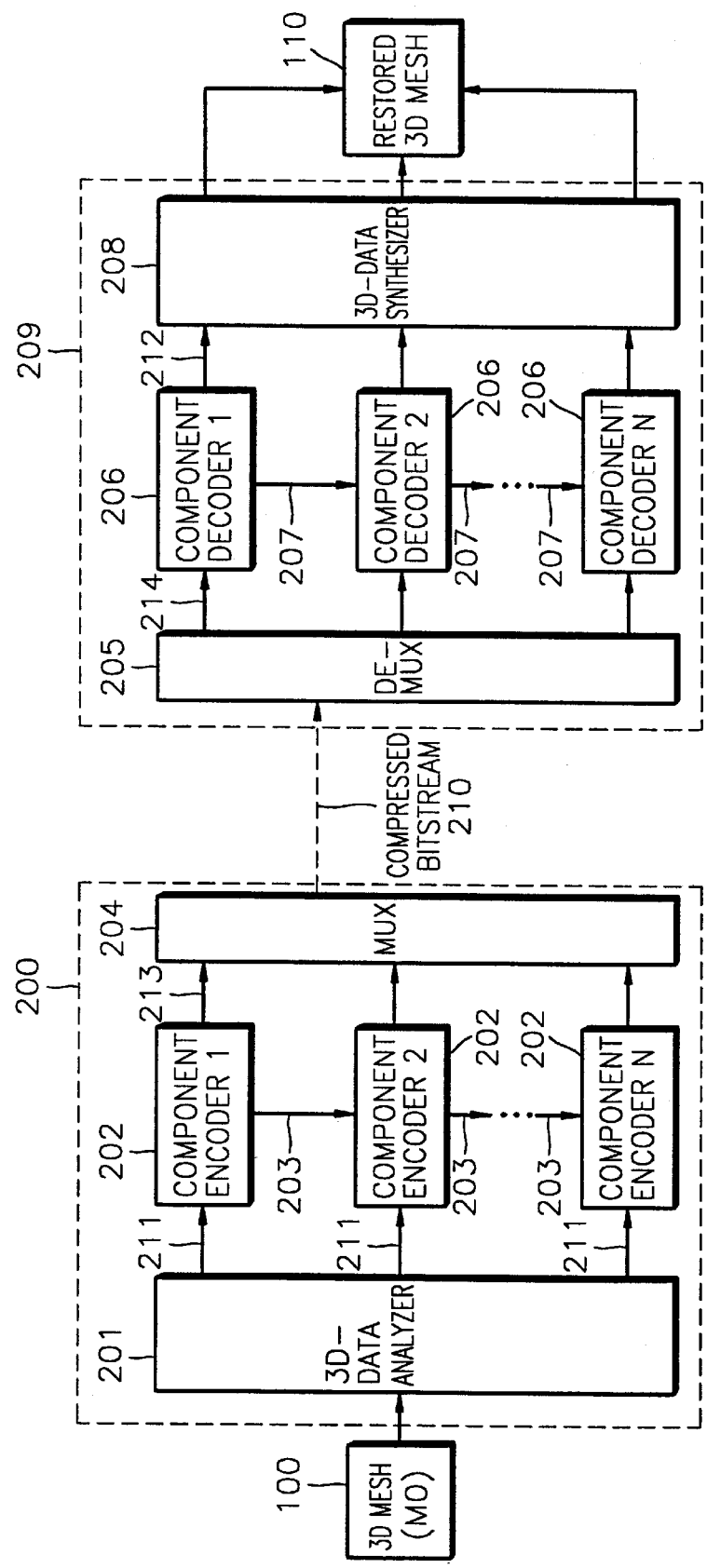
FIG. 6 is a conceptual block diagram of a progressive 3D mesh information coding/decoding method according to the present invention.

FIG. 6 is a conceptual block diagram of a progressive 3D mesh object information coding/decoding method according to the present invention. Referring to FIG. 6, a coding part 200 includes a 3D data analyzer 201, a plurality of component encoders (1 through N) 202 and a multiplexer (MUX) 204. A decoding part 209 includes a demultiplexer (DEMUX) 205 and a plurality of component decoders (1 through N) 206 and a 3D data synthesizer 208.

Firstly, a 3D mesh object 100 is reconstructed into at least one mesh object layer (MOL) 211 by a 3D data analyzer 201 and each MOL is reconstructed into MCOMs. The MOLs or MCOMs are input to the plurality of component encoders 202 to then be compressed thereby. The compressed bitstreams are transmitted through the MUX 204. Here, the information 203 used in an upper-level component encoder is also used in a lower-level component encoder.

The compressed bitstream 210 having transmitted to the decoding part 209 is classified into units of MOLs by a demultiplexer (DEMUX) 205 and is further divided into MCOMs to then be decoded by the component decoders (1 through N) 206. Here, the information 207 used in an upper-level component decoder is used again in a lower-level component decoder. The MCOM decoded by each component decoder is restored into a 3D mesh object 110 by the 3D data synthesizer 208.

When a 3-D mesh composed of a polygon represented by several vertices is a triangle mesh having three vertices, a method for incorporating a progressive coding function into a 3-D mesh coding method for coding the respective vertices and the corresponding triangle construction information including geometry information and connectivity information, will now be described in detail.

Figure 7:
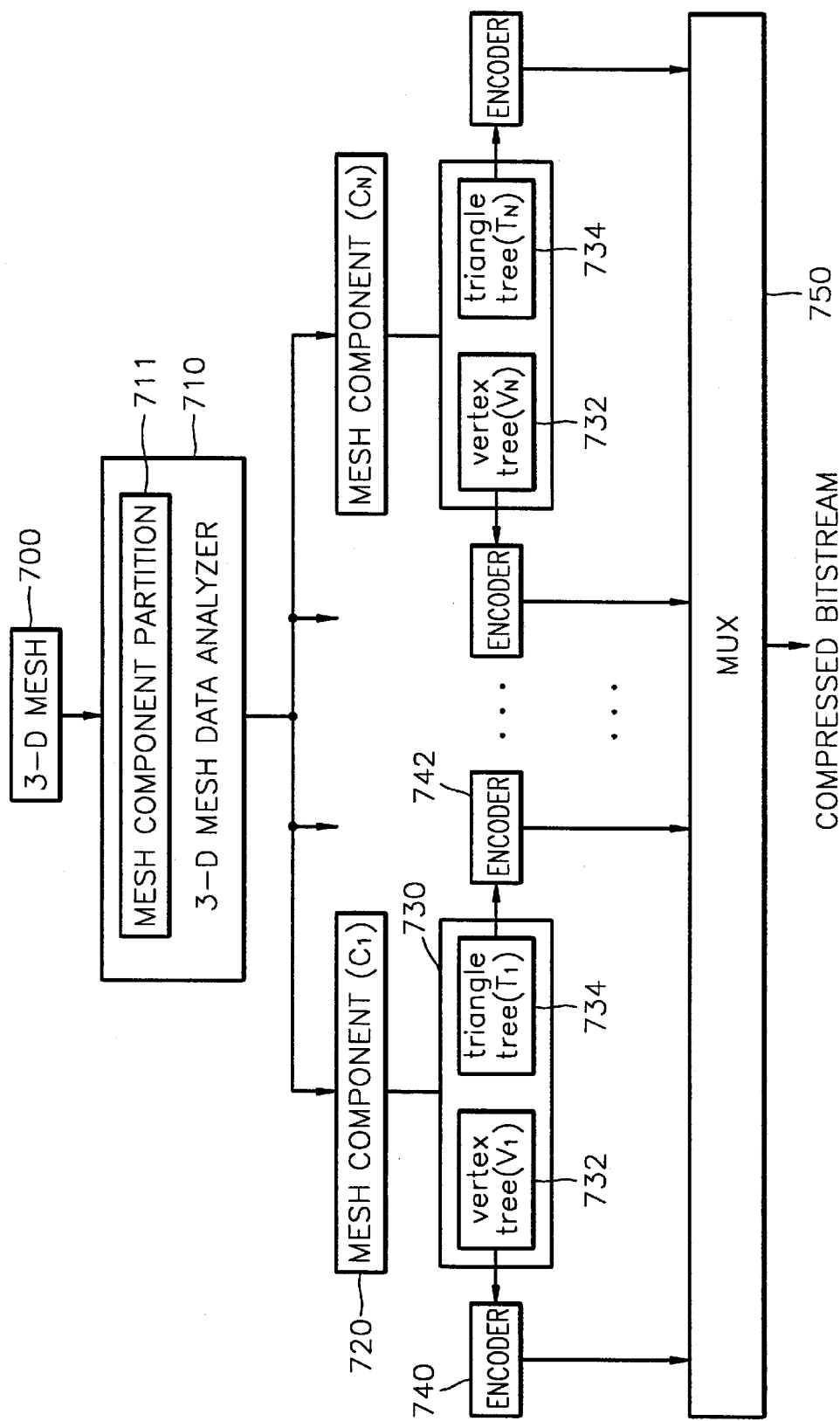
FIG. 7 is block diagram of a progressive 3D mesh information coding apparatus according to an embodiment of the present invention.

FIG. 7 is block diagram of a progressive 3D mesh object information coding apparatus according to an embodiment of the present invention, in which progressive coding is performed in units of MCOMs.

A 3-D mesh data analyzer 710 receives a 3-D mesh 700 to be coded and partitions the same into a plurality of 3-D mesh components $C_1$ through $C_N$ each having a 3-D binary mesh tree which can construct a 3-D mesh component independently without connectivity information (step 711). Each partitioned mesh component ($C_1$) 720 has a different size depending on the depth of a mesh tree and the number of nodes. A bitstream 730 composed of each mesh component unit is mesh information of each mesh component and includes a vertex binary tree information ($V_1$) 732 and a triangle binary tree information ($T_1$) 734. Here, a vertex binary tree and a triangle binary tree constituting a mesh component ($C_1$) are compressed and coded by encoders 740 and 742. Next, the coded mesh components are combined into a compressed bitstream to then be transmitted through a multiplexer 750.

Figure 8:
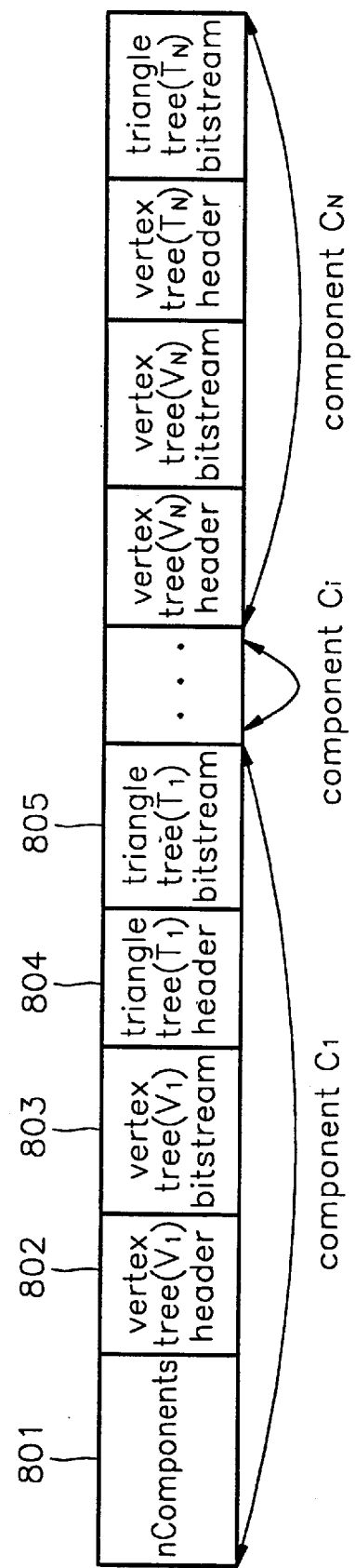
FIG. 8 illustrates an example of the syntax for explaining an embodiment of a progressive 3D mesh information coding method implemented by the apparatus shown in FIG. 7.

FIG. 8 illustrates an example of the syntax for explaining an embodiment of a progressive 3D mesh object information coding method according to the present invention. The total number (nComponents) 801 of all mesh components present in 3-D mesh object information to be first coded among bitstreams of a plurality of mesh components is represented in addition to the header information 802 of a vertex binary tree. In order to restore the vertex binary tree 732 and the triangle binary tree 734 which constitute all the mesh components $C_1$ through $C_N$, in the decoding part, headers 802 and 804 containing vertex and triangle tree construction information, and vertex and triangle tree bitstreams 803 and 805 are transmitted.

In the case of performing progressive coding in units of mesh components, the coding complexity can be reduced but the coding and restoration efficiencies are lowered due to transmission errors.

In the case of applying the progressive coding performed in units of mesh components to various applicable fields requiring coding efficiency, when a plurality of small mesh components constitute an MOL, header information becomes larger than the information to be actually coded, thereby lowering the overall coding efficiency. Therefore, in the 3-D mesh data analyzing step, small mesh components must be combined into a single mesh component to be suitable for a limited capacity transmission path or the storage capacity of a decoder.

Figure 9:
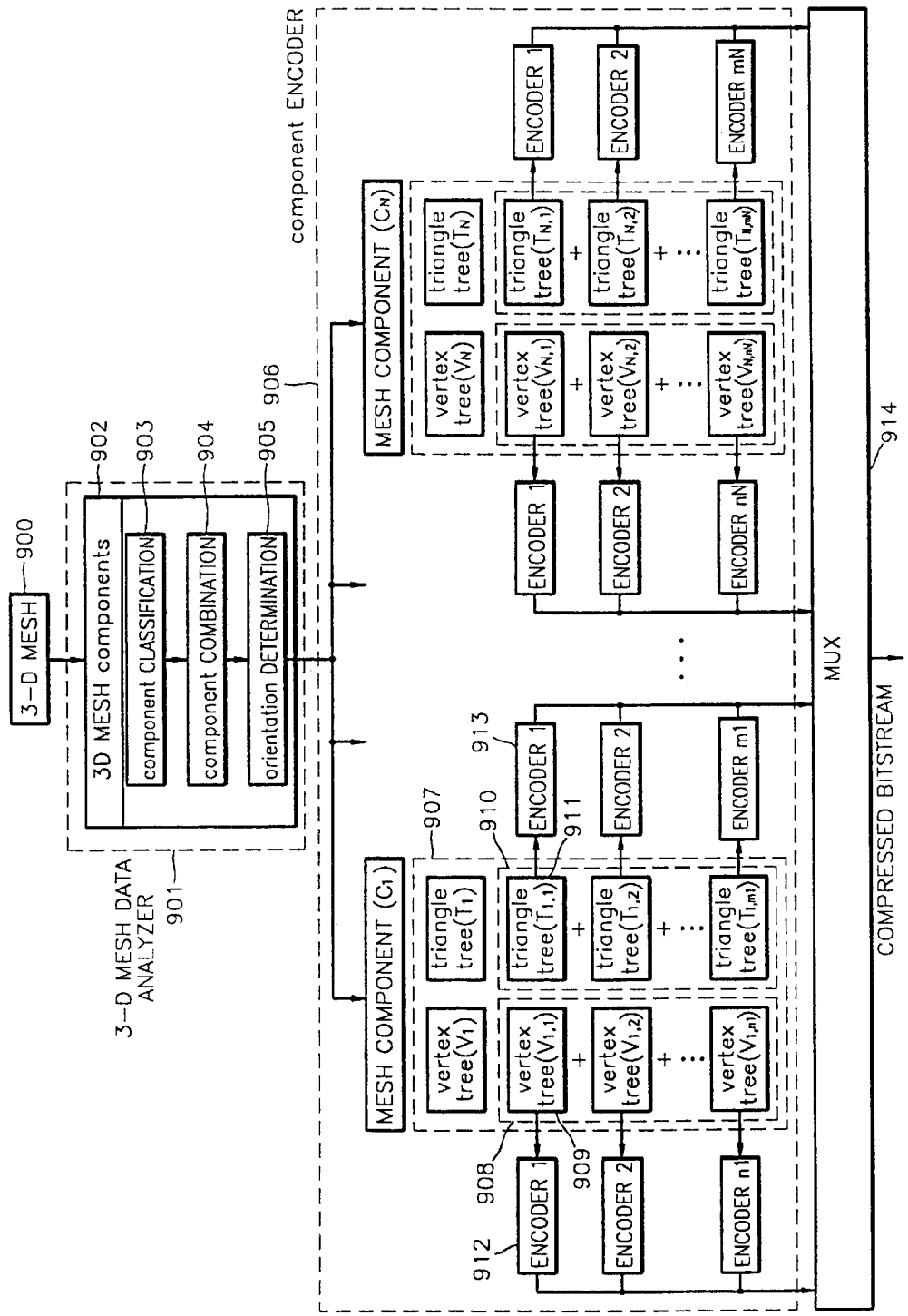
FIG. 9 is block diagram of a progressive 3D mesh information coding apparatus according to another embodiment of the present invention.

FIG. 9 is block diagram of a progressive 3D mesh object information coding apparatus according to another embodiment of the present invention, in which progressive coding is performed to form bitstreams of a uniform size having connectivity information in a mesh component.

Referring to FIG. 9, a 3-D mesh data analyzer 901 partitions an input 3-D mesh 900 into a plurality of 3-D mesh components 902. Next, the plurality of 3-D mesh components 902 are classified in accordance with size information (step 903) and mesh components smaller than a predetermined size are combined (step 904) to be reconstructed such that all mesh components have a predetermined size. Then, with respect to the reconstructed mesh components, mesh data 908 and 910 in each mesh component are partitioned into units of bitstreams 909 and 911 having a predetermined size and coded using encoders 912 and 913. Next, the coded mesh components are combined into a compressed bitstream to then be transmitted through a multiplexer 914.

Here, mesh component combination 904 can be processed by simply connecting trees in each mesh component in accordance with root information because mesh components have independent structures from one another without mutual connectivity information. After reconstructing each mesh component to have a predetermined size in such a manner, in consideration of the limited capacity transmission path and the storage capacity of a decoder, 3-D mesh data of each mesh component are partitioned to have a predetermined size. Accordingly, bitstreams having an error can be more efficiently transmitted and restored.

In the present invention, 3-D mesh data of each mesh component are partitioned to have a predetermined size using the reference number of vertices (vertices_per_data) and the reference number of triangles (triangle_per_data).

First, in the mesh component combination step 904, if the total number of vertices in a vertex binary tree constituting a mesh component is smaller than the reference number of vertices (vertices_per_data), the mesh component is combined with the mesh component to be coded next. Accordingly, all mesh components to be coded are reconstructed to have a vertex binary tree in which the total number of vertices is larger than the reference number of vertices (vertices_per_data).

If reconstruction is performed in such a manner, the vertex binary tree information and triangle binary tree information constituting mesh data in each mesh component are partitioned into units of the reference number of vertices (vertices_per_data) and the reference number of triangles (triangle_per_data). Here, partitioning is performed along the respective tree in a constant orientation (e.g., counterclockwise).

Figure 10A:
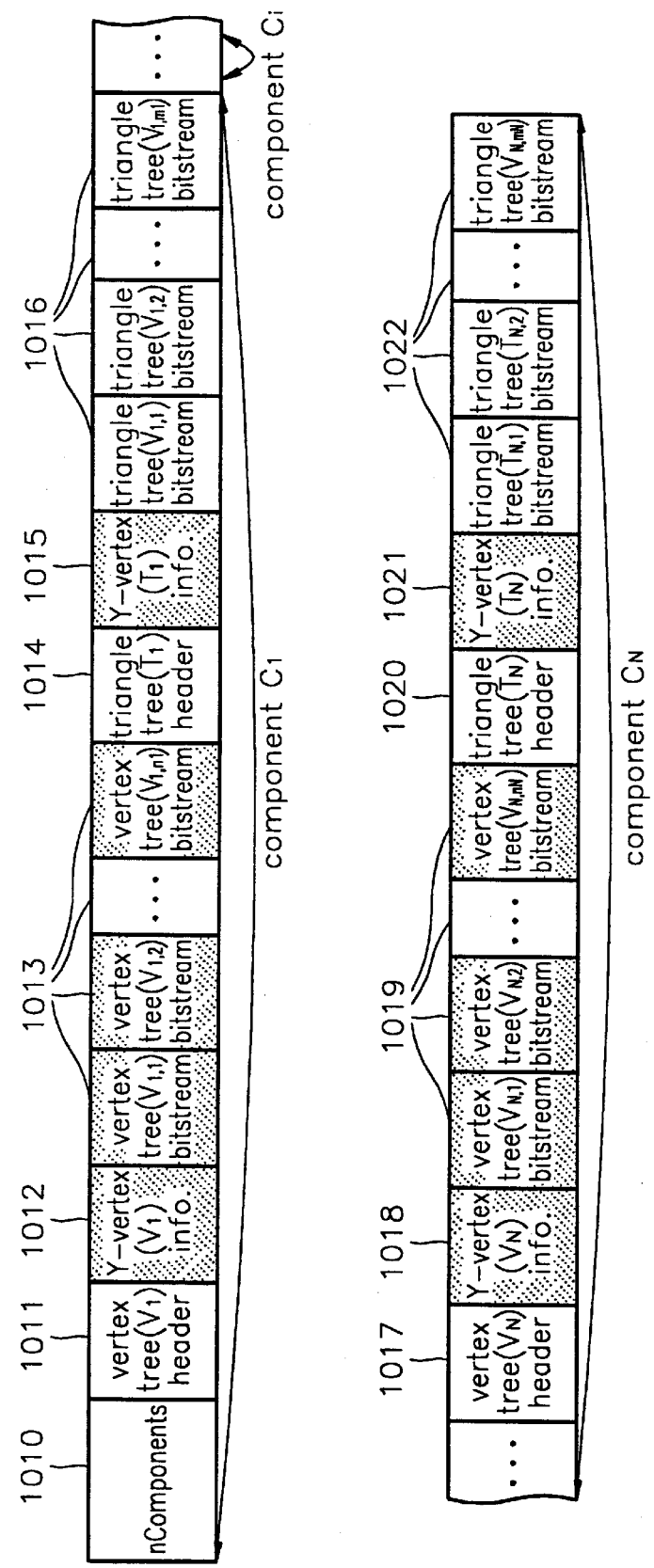
FIGS. 10A through 10F illustrate an example of the syntax for explaining another embodiment of a progressive 3D mesh information coding method implemented by the apparatus shown in FIG. 9.

The partitioned 3-D mesh data are compressed/coded by encoders 912 and 913. The compressed bitstreams transmitted to the decoding part are shown in FIG. 10A. The total number 1010 of mesh components $C_1$ through $C_N$ reconstructed in the mesh component combination step 904, the vertex binary tree ($V_1$) header through the vertex binary tree ($V_N$) header (1011 and 1017), and the triangle binary tree ($T_1$) header through the triangle binary tree ($T_N$) header (1014 and 1020) are constructed to be the same as those shown in FIG. 8. The 3-D mesh data partitioned in each mesh component are comprised of 1013, 1016, 1019 and 1022. In other words, the reconstructed 3-D mesh data partitioned into units of bitstreams having a predetermined size by a partitioning process, are composed of the respective bitstreams of a plurality of vertex binary trees $V_{1,1}$ through $V_{1,n1}$, . . . and $V_{N,1}$ through $V_{N,nN}$, and a plurality of triangle binary trees $T_{1,1}$ through $T_{1,m1}$, . . . and $T_{N,1}$ through $T_{N,mN}$. Here, N, m and n are integers greater than zero.

Also, in order to support progressive rendering by transmitting the bitstreams in a predetermined size unit, bitstreams for constructing N triangles from triangle binary tree information, in consideration of a local entropy coding efficiency. For example, N trun data and one tleaf data are separated from N-1 tmarching data and N polygonedge data. Accordingly, the entropy coding efficiency and a rendering effect can be improved.

As described above, when the 3D mesh information within one mesh component is partitioned to have a predetermined size to then be coded, the information which must be taken into consideration in view of the decoding part is required. In other words, when the decoding part receives and progressively restores some of the partitioned 3D mesh bistreams for rendering, since the restoration order of a triangle tree is fixed, a problem may be encountered. That is, during restoration, when a Y-vertex belonging to both left and right triangles with respect to a triangle at a branching point within a triangle binary tree is decoded, it is impossible to decode the Y-vertex without knowing the information forming the triangle tree to the right. Thus, until untransmitted 3D mesh information are all obtained, the rendering for the progressive decoding operation cannot be further performed. In other words, the progressive decoding operation corresponding to the progressive coding operation is not performed properly.

Therefore, in order to progressively code/decode the 3D mesh information, the Y-vertex information as represented by 1012, 1015, 1018 and 1021 in FIG. 10A, which can provide the connectivity information of the right tree at a branching point of a binary tree, must be formed within a bitstream to be transmitted to the decoding part.

Figures 10B, 10C, 10D:
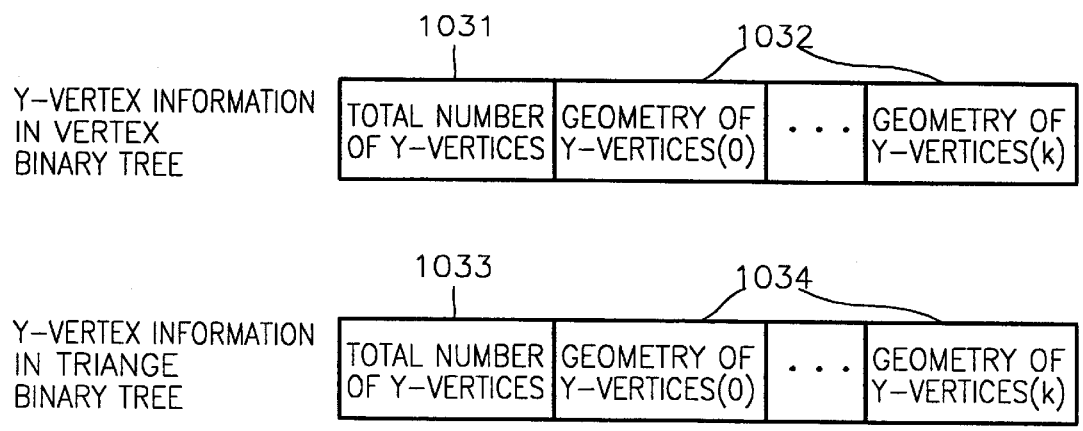

In order to solve this problem, first, Y-vertex information in a vertex binary tree and a triangle binary tree is generated, as shown in FIG. 10B. In FIG. 10B, the Y-vertex information of a vertex binary tree and the Y-vertex information of a triangle binary tree include integers of the total number of Y-vertices 1031 and 1033 present in the respective reconstructed mesh components, and the geometry information of Y-vertices 1032 and 1034 represented by the total number of triangles present in a tree positioned on the right of a branching point of the triangle binary tree with respect to each Y-vertex, respectively. The Y-vertex information is represented in addition to bitstreams of the plurality of vertex binary trees and triangle binary trees. In other words, in FIG. 10A, either the information represented by reference numerals 1012 and 1018 or the information represented by reference numerals 1015 and 1021 is inserted to bitstreams.

Figure 10E:
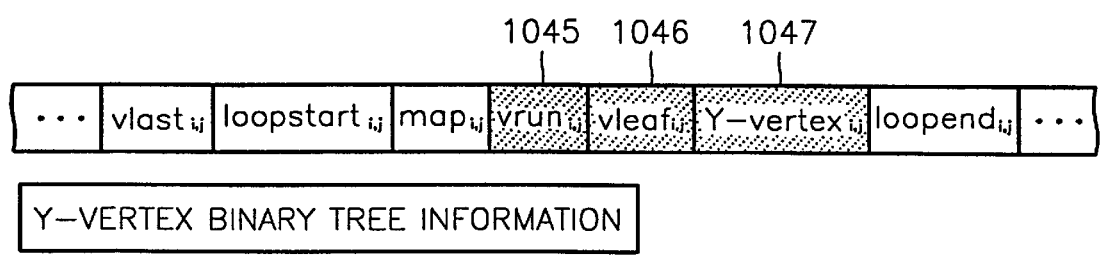

Second, Y-vertex information is transmitted with a reduced number of bits, compared to in the first method. In a vertex binary tree, vrun==1 && vleaf==0 represents a branching point of a tree, and vrun==1 && vleaf==1 represents an end point. Referring to FIG. 10C, when a Y-vertex (==1) appears, vrun is represented as 1, vleaf is represented as 0, with the exception of a branching point or an end point, to provide information on Y-vertex generation and geometry information using the number of vrun units. Here, the number of Y-vertices is represented by an integer for each mesh component, like 1012 or 1018. Therefore, the bitstreams changing in the vertex binary tree information are shown in FIGS. 10D and 10E.

Figure 10F:
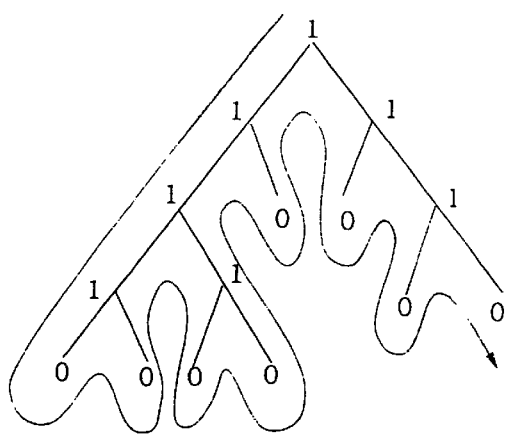

In a triangle binary tree, the information on the order of Y-vertices is generated as a binary tree shown in FIG. 10F in the order in which units of partitioned 3-D mesh data are transmitted to the decoding part. The binary tree information represented in the form of binary trees is composed of a series of 0's and 1's, in which bits corresponding to 2*(the number of Y-vertices)+1 are generated. In other words, in the binary tree shown in FIG. 10F, bits of "11110011100000" are generated, and the thus-constructed binary tree information is compressed/coded by encoders, thereby enhancing the coding efficiency.

That is to say, as shown in FIG. 10D, the number of Y-vertices present in each reconstructed mesh component is represented by reference numerals 1012 and 1018 as the Y-vertex information in addition to the plurality of vertex tree bitstreams 1013 and 1019. Also, as shown in FIG. 10E, the Y-vertex geometry information 1047 is represented in addition to symbols 1045 and 1046 representing a branching point and an end point, respectively, of each vertex binary tree in the respective bitstreams of the plurality of vertex binary trees.

As the Y-vertex information for a triangle binary tree, the Y-vertex binary tree information representing the information on the order of Y-vertices which is generated as a binary tree is represented in addition to the bitstreams 1016 and 1022 of the plurality of triangle binary trees by reference numerals 1015 and 1021.

As described above, in the progressive coding method in which the 3D mesh information within a connected component is partitioned so as to have a predetermined size, and the connectivity information of the Y-vertex is also formed to be coded for rendering, the coding efficiency may be deteriorated due to additional information of the geometry information and order of the Y-vertex. This problem may be caused by forming the tree in only a fixed direction and coding the same in the fixed direction and can be solved by adaptively varying the coding direction in which the connectivity information is not necessary or minimally required when the Y-vertex is visited in the partitioned 3D mesh information.

FIGS. 11A through 11D illustrate an example of the syntax for explaining another embodiment of a progressive 3D mesh object information coding method using topological surgery according to the present invention, in which bitstreams having a uniform size are formed in a mesh component.

Figure 11A:
FIGS. 11A through 11D illustrate an example of the syntax for explaining another embodiment of a progressive 3D mesh information coding method.
Figure 11B:
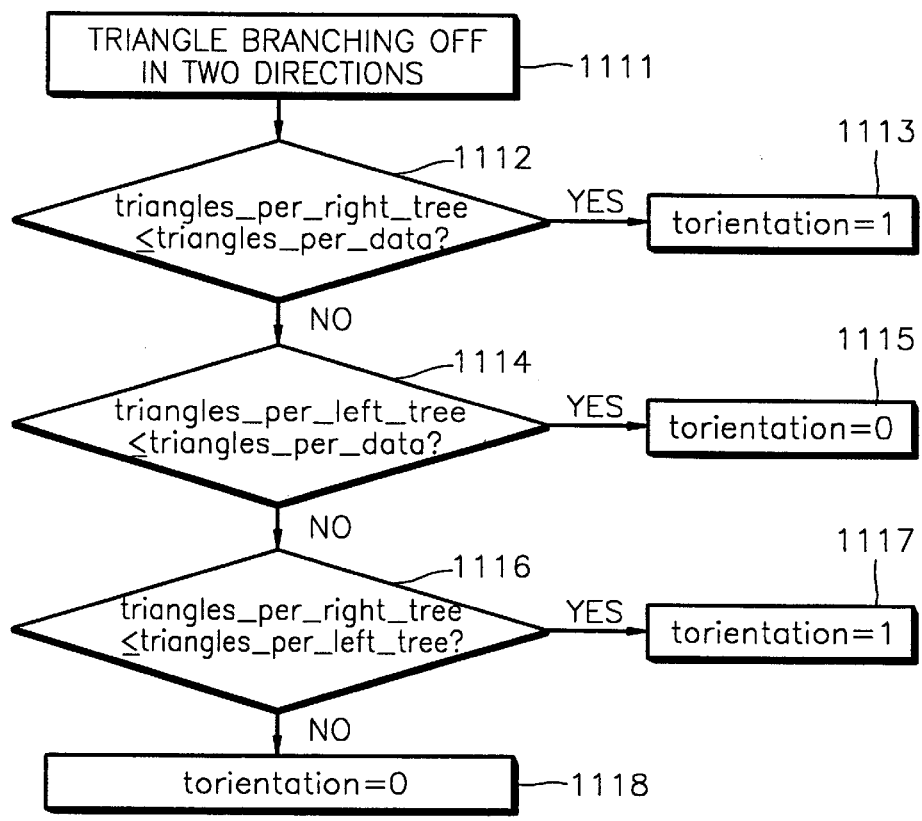

As shown in FIG. 11B, when a triangle having a Y-vertex in a triangle binary tree is visited (step 1111), the coding order of the triangle binary tree is sequentially determined based on triangles_per_data used when the triangle binary tree within a connected component is partitioned equally into units of a specific size and coding priority for triangles_per_right_tree for indicating the number of triangles in the right branch. Then, a torientation marker 1100 for indicating the coding direction is provided in the bitstreams of the triangle binary tree, as shown in FIG. 11A.

A torientation indications whether the left or right side of the branching triangle is decoded first in a decoding process. If 0 is given to the torientation, the left side is decoded first. If 1 is given to the torientation, the right side is decoded first.

For example, if a triangle having a Y-vertex is visited (step 1111), first, it is determined whether triangles_per_right_ tree is less than or equal to triangles_per_data (step 1112). If yes, torientation is set to 1 (step 1113). If not, it is determined whether triangles_per_left_tree is less than or equal to triangles_per_data (step 1114). If yes, torientation is set to 0 (step 1115). If not, it is determined whether triangles_per_right_tree is less than or equal to triangles_per_left_tree (step 1116). If yes, torientation is set to 1 (step 1117), and if not, torientation is set to 0 (step 1118).

Here, if the torientation is 0, in a state where the root is positioned above, a dependent triangle binary tree in the left branch (i.e., counterclockwise) is first coded. If the torientation is 1, in a state where the root is positioned above, a dependent triangle binary tree in the right branch (i.e., clockwise) is first coded. Also, even if a triangle having a Y-vertex is visited within a dependent triangle binary tree whose coding orientation is determined, the coding orientation is not indicated.

Figure 11C:
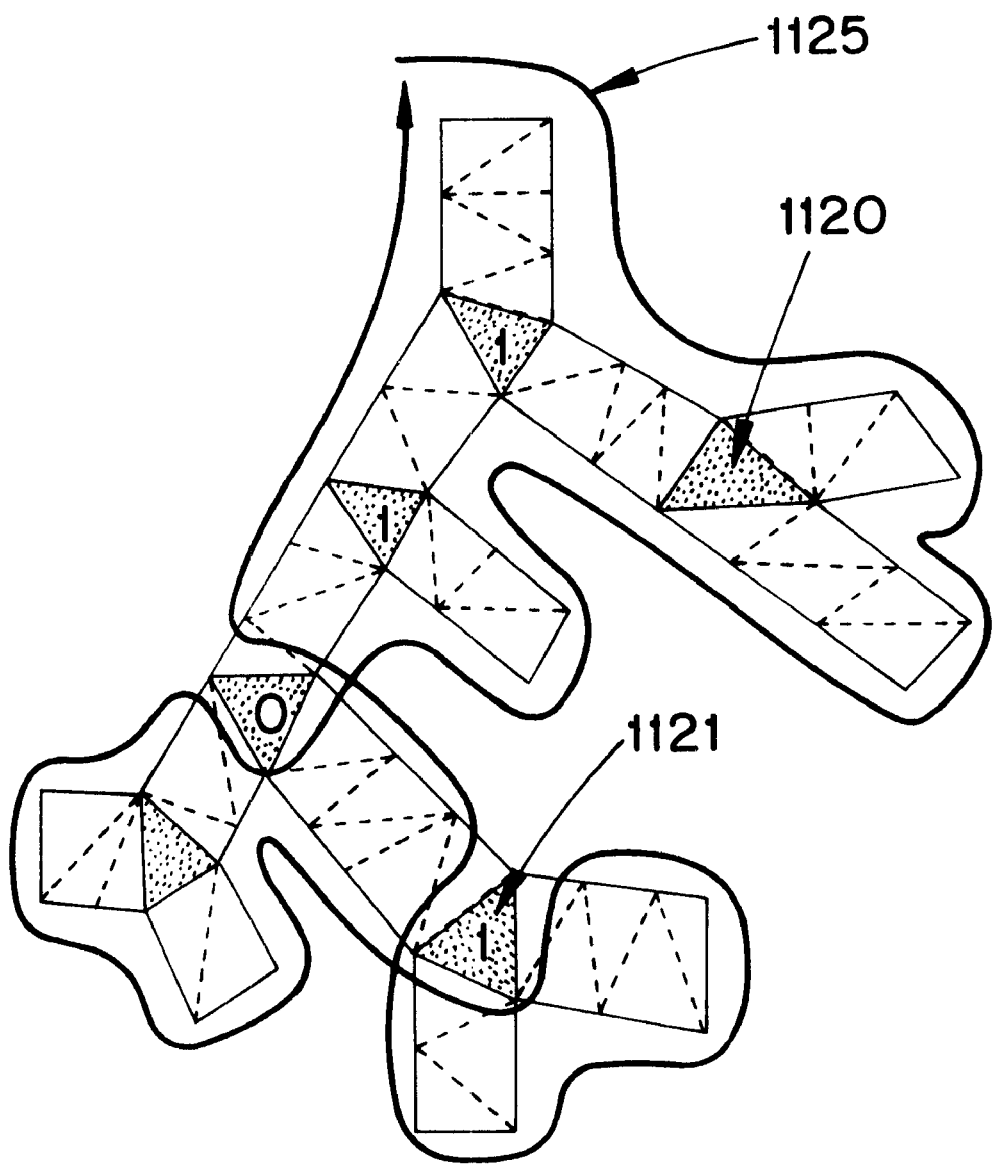

An example of the procedure of generating torientation, which is an orientation marker, by the above-described coding orientation determining method is shown in FIG. 11C, in which reference numerals 1120 and 1121 denote triangles having Y-vertices in a dependent triangle binary tree whose orientation marker is already determined. Thus, the orientation marker is not defined. Reference numeral 1125 denotes the order of transmitting and rendering compressed bitstreams of 3D mesh information to the decoding part.

Figure 11D:
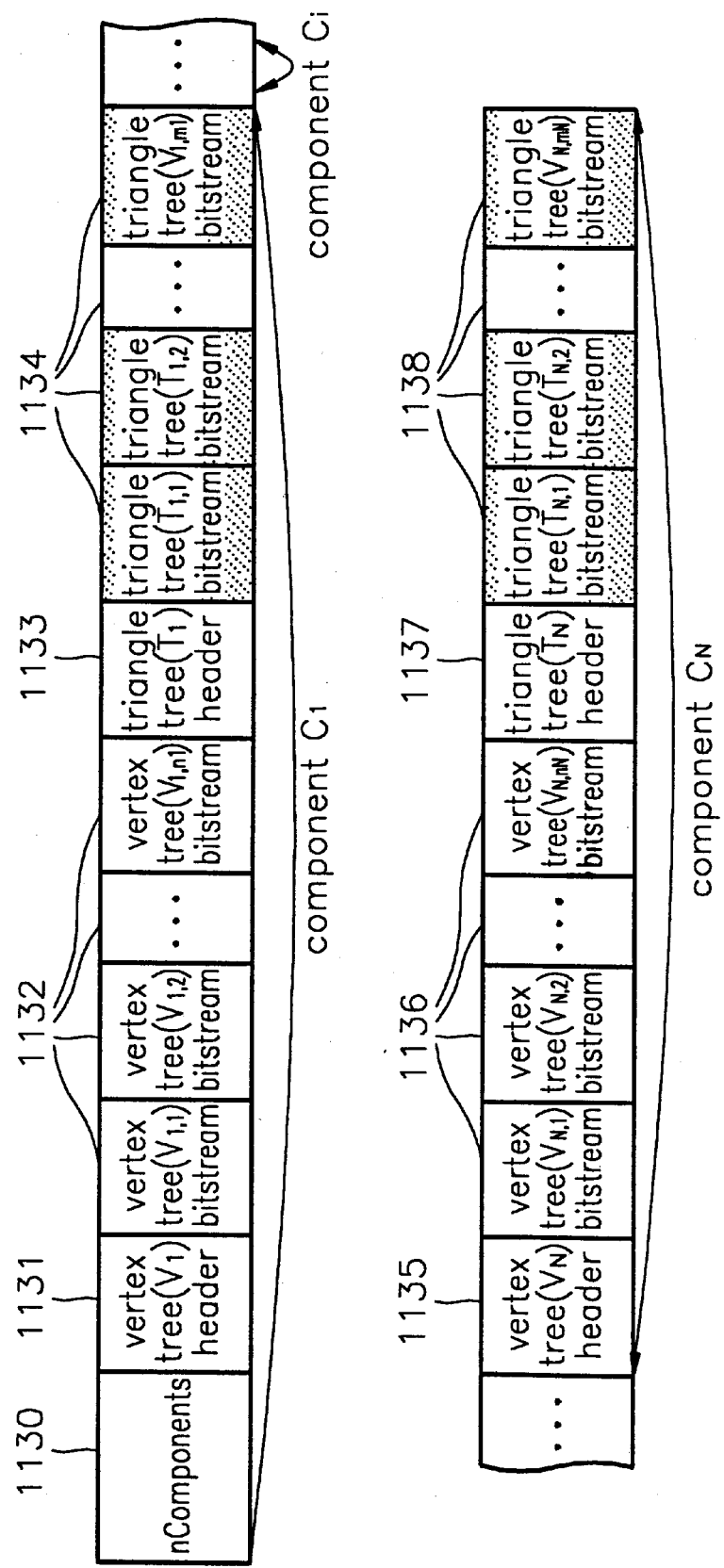

FIG. 11D is a diagram showing compressed bitstreams according to another embodiment of the present invention, the bitstreams having orientation information. Like in FIG.10A, the compressed bitstreams include nComponents 1130, indicating the total number of reconstructed mesh components, vertex tree headers 1131 and 1135 and triangle tree headers 1133 and 1137, constituting the respective mesh components, vertex tree bitstreams 1132 and 1136 of a plurality of vertex binary trees partitioned into units of bitstreams having a predetermined size and reconstructed, and triangle tree bitstreams 1134 and 1138 of a plurality of triangle binary trees. In addition, torientation$_{ij}$ (1100 of FIG. 11A) indicating the coding order in triangles branching in two directions in a triangle binary tree, is further provided in the respective bitstreams $T_{ij}$ of the plurality of triangle binary trees.

The presence of the indication information of the orientation marker is determined by checking whether all leaf triangles in the dependent triangle trees are restored or not. In other words, the feature that the total number of leaf triangles within the dependent triangle binary tree is the same as the sum of the number of triangles with an orientation marker and triangles without an orientation marker and with Y-vertices, is used as a determination condition.

Among components of a triangle tree, tmarching information defining the marching aspect of triangles is seldom overlapped, which results in a low entropy coding efficiency. Therefore, in the present invention, in order to enhance the coding entropy of tmarching information in a construction unit and in order to effectively support progressive rendering in constructing bitstreams of 3-D mesh data in a predetermined size, bitstreams of a triangle binary tree are constructed such that symbols with a high degree of overlap are separated from symbols with a low degree of overlap, thereby enhancing a coding efficiency. In other words, in constructing N triangles, N trun units and M tleaf units ($0 \leq M \leq N$), in which M denotes the number of branches and leaves constituting the triangle binary tree, are separately constructed from (N−M) tmarching units and N polygonedge units, thereby enhancing the low entropy coding efficiencies of tmarching information and trun information and further enhancing the rendering efficiency.

Figures 12A, 12B:
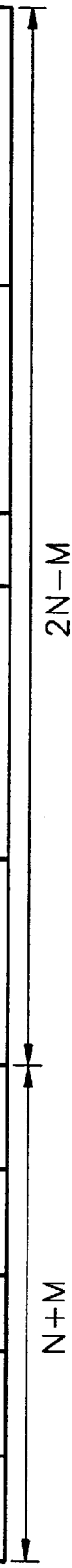
FIGS. 12A and 12B illustrate an example of the syntax for explaining a bitstream construction method of triangular binary tree information according to the present invention.

FIG. 12A shows an example of a bitstream constructed by a general method, and FIG. 12A shows an example of a bitstream constructed by a method proposed in the present invention.

In FIG. 12B, only when trun=1, that is, when a triangle branches, tleaf is generated next to trun. tmarching is generated only when trun=0, that is, a triangle is not branched. Also, ispolygonedge is generated only when there is at least one polygon other than a triangle. If not, ispolygonedge information is not provided in a bitstream.

As described above, in a 3-D mesh coding method and apparatus using topological surgery according to the present invention, progressive 3D mesh restoration and 3D mesh layer discrimination are allowed, unlike in the conventional topological surgery system. Also, in contrast with the conventional method in which restoration cannot be initiated until all bitstreams are received without a transmission error, in the present invention, once bitstreams in units of mesh components are transmitted, the 3D mesh information can be reproduced in units of a single triangle by using vertex binary tree and triangle binary tree information of connectivity. That is to say, while the overall delay applies until all bitstreams are transmitted in the conventional method, the overall delay in the present invention corresponds to the length of a mesh component. Even before one mesh component is completely transmitted, restoration is performed in units of triangles after important information including vertex binary tree information is received. Further, even if transmission errors are generated, in a state in which bitstreams are formed in units of mesh components, the errors can be localized.

What is claimed is:

1. A progressive three dimensional (3D) mesh coding method for progressive restoration of 3D mesh information comprising the steps of:
   (a) constructing a 3D triangle mesh of one or more mesh object layers;
   (b) partitioning each mesh object layer into a plurality of mesh components;
   (c) forming bitstreams in units of mesh components and coding the same; and
   (d) combining the coded mesh components into compressed bitstreams and transmitting the same.

2. The progressive coding method according to claim 1, wherein the bitstreams formed in units of mesh components include vertex binary tree information and triangle binary tree information as the mesh data in each mesh component, and the total number of mesh components is represented in addition to the vertex binary tree information to be first coded among the bitstreams of the mesh components.

3. A progressive 3D mesh coding method comprising the steps of:
   (a) constructing a 3D triangle mesh of one or more mesh object layers;
   (b) partitioning each mesh object layer into a plurality of mesh components;
   (c) classifying the plurality of mesh components in accordance with size information of each mesh component, combining mesh components having a first predetermined size or smaller and reconstructing all mesh components to have a size greater than the first predetermined size;

(d) partitioning mesh data in each mesh component into units of bitstreams having a second predetermined size and coding the same; and (e) combining the coded mesh data into compressed bitstreams and transmitting the same.

4. The progressive 3D mesh coding method according to claim 3, wherein in the step (c), if the total number of vertices in a vertex binary tree constituting a mesh component is less than or equal to the reference number of vertices, the mesh component is combined with the mesh component to be coded next to be reconstructed such that the mesh components to be coded have a vertex binary tree in which the total number of vertices is greater than a first predetermined reference number of vertices.

5. The progressive 3D mesh coding method according to claim 4, wherein in the step (d), the vertex binary tree information and triangle binary tree information constituting mesh data in each mesh component are partitioned into a second predetermined reference number of vertices and into a predetermined number of triangles.

6. The progressive 3D mesh coding method according to claim 3, wherein in the step (d), the vertex binary tree information and triangle binary tree information constituting mesh data in each mesh component are partitioned into a second predetermined reference number of vertices and into a predetermined number of triangles.

7. The progressive 3D mesh coding method according to claim 3, wherein the compressed bitstreams include the total number of mesh components reconstructed in the step (c), vertex tree headers and triangle tree headers constituting the respective reconstructed mesh components, and vertex tree bitstreams of a plurality of triangle binary trees and triangle tree bitstreams of a plurality of triangle binary trees, partitioned into units of bistreams having a second predetermined size and then reconstructed.

8. The progressive 3D mesh coding method according to claim 7, wherein the compressed bitstreams further include Y-vertex information which provides connectivity information in a constant direction at a branching point of a binary tree, the Y-vertex information including the total number of Y-vertices present in the respective reconstructed mesh components, and geometry information of Y-vertices represented by the total number of triangles present in a tree positioned to the right of a branching point of the triangle binary tree with respect to each Y-vertex, respectively, and the Y-vertex information represented in addition to each of bitstreams of the plurality of vertex binary trees and bitstreams of the plurality of triangle binary trees.

9. The progressive 3D mesh coding method according to claim 7, wherein the compressed bitstreams further include Y-vertex information which provides connectivity information in a constant direction at a branching point of a binary tree, the Y-vertex information including the total number of Y-vertices present in the respective reconstructed mesh components, the geometry information of Y-vertices represented as one bit in addition to symbols the branching point and end point of each vertex binary tree, and binary tree information of a Y-vertex representing information on the order of Y-vertices in the form of binary trees.

10. A progressive 3D mesh coding method comprising the steps of:

(a) constructing a 3D triangle mesh of one or more mesh object layers;

(b) partitioning each mesh object layer into a plurality of mesh components;

(c) inserting orientation information indicating the coding order of branches having branched from a branching triangle of a triangle binary tree into each mesh component, and coding the same; and (d) combining the coded mesh data into compressed bitstreams and transmitting the same.

11. The progressive 3D mesh coding method according to claim 10, wherein the step (c) comprises the sub-steps of:

(c1) classifying the plurality of mesh components in accordance with size information of each mesh component and combining mesh components having a size less than or equal to a first predetermined size, so that all mesh components are reconstructed such that they have a constant size;

(c2) partitioning mesh data in each mesh component among the reconstructed mesh components into units of bitstreams having a second predetermined size; and (c3) inserting orientation information into the bitstreams and coding the same.

12. The progressive 3D mesh coding method according to claim 11, wherein the compressed bitstreams include the total number of mesh components reconstructed in the step (c1), vertex tree headers and triangle tree headers constituting the respective reconstructed mesh components, and vertex tree bitstreams of a plurality of triangle binary trees and triangle tree bitstreams of a plurality of triangle binary trees, partitioned into units of bistreams having a second predetermined size and then reconstructed in the sub-step (c2).

13. The progressive 3D mesh coding method according to claim 12, wherein the orientation information is represented such that in consideration of the sizes of two branches in branching triangles contained in a triangle binary tree for the mesh components reconstructed in the sub-step (c1) and a predetermined reference number of triangles, if the number of branching triangles is larger than the predetermined reference number of triangles, a relatively smaller branch is first coded.

14. The progressive 3D mesh coding method according to claim 11, wherein the orientation information is represented such that in consideration of the sizes of two branches in branching triangles contained in a triangle binary tree for the mesh components reconstructed in the sub-step (c1) and a predetermined reference number of triangles, if the number of branching triangles is larger than the predetermined reference number of triangles, a relatively smaller branch is first coded.

15. The progressive 3D mesh coding method according to claim 10, wherein in the step (c), when constructing triangle binary tree information for each mesh component, N trun units and M tleaf units, in which N is the number of triangles constituting the triangle binary tree and M is greater than or equal to zero and less than or equal to N, are constructed separately from triangle marching information and polygonal edge information, to increase the entropy coding efficiency and rendering efficiency.

16. A progressive three dimensional (3D) mesh coding apparatus for progressive restoration of 3D mesh information comprising:

a 3D mesh data analyzing portion for constructing a 3D triangle mesh of one or more mesh object layers and partitioning each mesh object layer into a plurality of mesh components;

a plurality of mesh component encoders for forming bitstreams in units of mesh components and coding the same; and a multiplexer for combining the coded mesh components into compressed bitstreams and transmitting the same.

17. A progressive 3D mesh coding apparatus comprising:
- a 3D mesh data partitioning portion for constructing a 3D triangle mesh of one or more mesh object layers and partitioning each mesh object layer into a plurality of mesh components;
- a 3D mesh data classifying and combining portion for classifying the plurality of mesh components in accordance with size information of each mesh component, combining mesh components having a size less than or equal to a first predetermined size and reconstructing all mesh components to have a first predetermined size;
- a plurality of mesh component encoders for partitioning mesh data in each mesh component into units of bitstreams having a second predetermined size and coding the same; and
- a multiplexer for combining the coded mesh data into compressed bitstreams and transmitting the same.

18. The progressive 3D mesh coding method according to claim 17, wherein if the total number of vertices in a vertex binary tree constituting a mesh component is less than a first reference number of vertices, the 3D mesh data classifying and combining portion combines the mesh component with a mesh component to be coded next such that all mesh components to be coded are reconstructed to have a vertex binary tree in which the total number of vertices is larger than the first reference number of vertices.

19. The progressive 3D mesh coding method according to claim 18, wherein the plurality of mesh component encoders code the vertex binary tree information and triangle binary tree information constituting mesh data in each mesh component by partitioning the same into a second reference number of vertices and into a predetermined number of triangles, respectively.

20. The progressive 3D mesh coding method according to claim 17, wherein the plurality of mesh component encoders code the vertex binary tree information and triangle binary tree information constituting mesh data in each mesh component by partitioning the same into a second reference number of vertices and into a predetermined number of triangles, respectively.

21. A progressive three dimensional (3D) mesh coding apparatus for progressive restoration of 3D mesh information comprising:
- a 3D mesh data analyzing portion for constructing a 3D triangle mesh of one or more mesh object layers and partitioning each mesh object layer into a plurality of mesh components;
- a 3D mesh data classifying and combining portion for classifying the plurality of mesh components in accordance with size information of each mesh component, combining mesh components having a size less that or equal to a first predetermined size and reconstructing all mesh components to have a first predetermined size;
- an orientation determining portion for inserting into the mesh data in each mesh component among the reconstructed mesh components, orientation information representing the coding order in a triangle branching in two directions in triangle binary tree information;
- a plurality of mesh component encoders for forming bitstreams in units of mesh components and coding the same; and
- a multiplexer for combining the coded mesh components into compressed bitstreams and transmitting the same.

22. The progressive 3D mesh coding method according to claim 21, wherein the orientation determining portion determines orientation information such that in consideration of sizes of two branches in branching triangles contained in a triangle binary tree for the reconstructed mesh components, the smaller branch is first coded.

* * * * *